April 12, 1938.  C. H. WALSH  2,114,064

SWITCHING DEVICE

Filed April 6, 1936  2 Sheets—Sheet 1

INVENTOR
Carroll H. Walsh

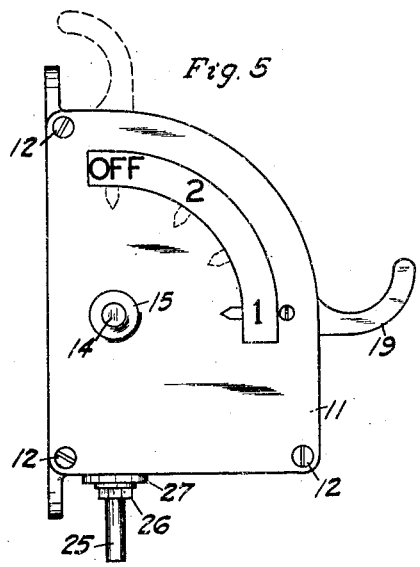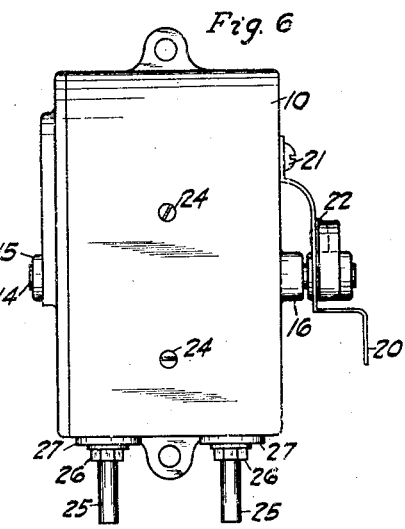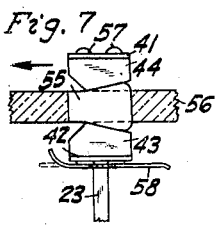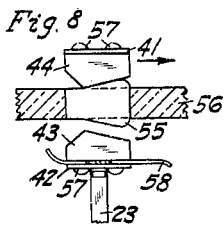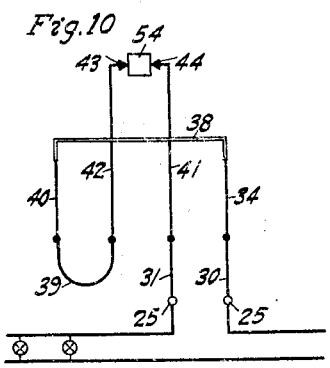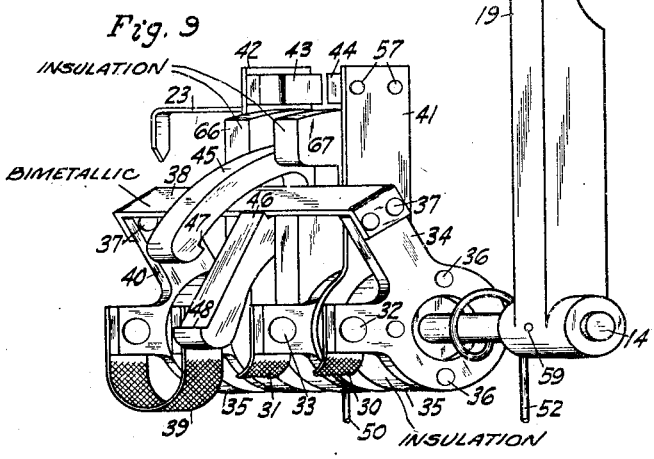

Patented Apr. 12, 1938

2,114,064

UNITED STATES PATENT OFFICE 2,114,064

SWITCHING DEVICE

Carroll H. Walsh, Pine Bluff, Ark.

Application April 6, 1936, Serial No. 72,877

4 Claims. (Cl. 200—116)

This invention relates generally to switches for use in connection with electrical circuits, and more particularly to that class of switching equipment adapted for disconnecting an overloaded circuit in response to a movement of a thermo-responsive member forming a part of the switch.

Among the objects of the present invention may be noted the provision of means for opening the connected circuit in response to a predetermined over-current therein; the provision of a device which cannot be manually held in the closed position if a predetermined over-current exists in the circuit, i. e., a "trip free" device; means for closing a circuit through the device in response to a rotative bodily movement of a thermo-responsive member embodied therein; the provision of a device which recloses a circuit in response to the cooling of a thermo-responsive member, the heating of which has been previously responsible for the opening of the circuit; and the provision of means for visibly indicating the position of the device with respect to the circuit.

Another object is to provide, in a switching device, a switch having one or more open positions, and one or more closed positions, and means responsive to the condition of the connected circuit for establishing the position of the switch.

With these and other objects in view which will appear from the description, this invention resides in the novel combination, construction, and arrangement of the parts making up the device, and in the relation of the various members to one another.

In the drawings:

Fig. 5 is a side elevational view of the assembled device.

Fig. 6 is a similar front elevational view.

Figs. 7 and 8 are fragmentary views illustrating the relation of the movable contacts to their cooperating guide.

Fig. 9 is an oblique view of the mechanism, shown without the housing.

Fig. 10 is a circuit diagram showing the connection of a circuit through the device.

Figure 1:
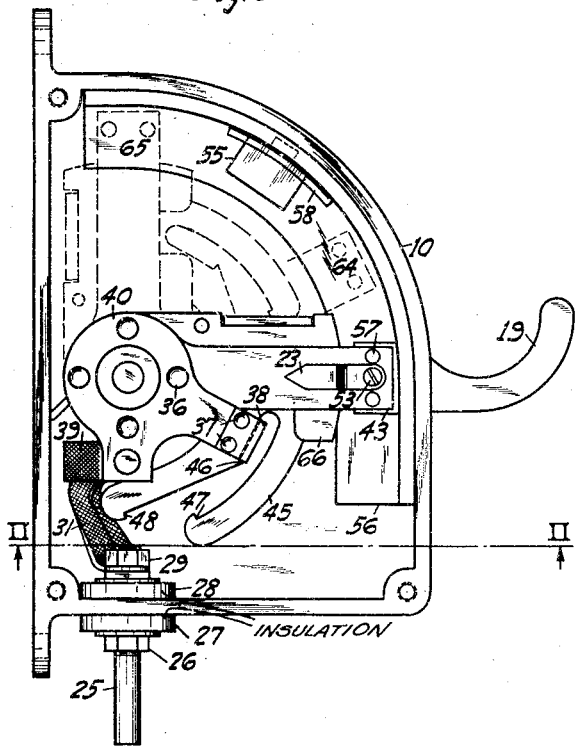
Fig. 1 is a side elevational view of the device, shown with the housing cover removed.

Referring now in detail to the drawings, a hollow metal body portion 10, together with the cover plate 11, provides a housing for the internal portions of the device. The screws 12 provide a convenient means for removably attaching the cover plate to the housing.

A shaft 14 is mounted for rotative or pivotal movement within the housing, the respective end portions of the shaft 14 being supported in the cover plate bearing 15 and the body portion bearing 16. A portion of the shaft 14 extends outwardly beyond the bearing 16, to which portion is rigidly secured, by means of the pin 59, the operating lever 19.

Within the housing, a support is provided for the thermo-responsive means, or bi-metallic strip 38. This support includes a pair of disks 35, of fiber or other suitable insulating material, which are tightly pressed on the shaft 14 at points adjacent the opposing walls of the housing, and therefore rotatively move in response to rotation of the shaft 14.

The bi-metallic strip 38 is secured, adjacent its respective ends, by the rivets 37, to the outer end portions of the conducting supporting members 34 and 40 respectively, and the latter may be conveniently riveted, in spaced relation to the shaft 14, to the disks 35, by the rivets 36.

In this manner a support, on which is mounted the bi-metallic strip 38, is provided within the housing, this support being rigidly secured to the shaft 14, and rotating therewith.

Figure 3:
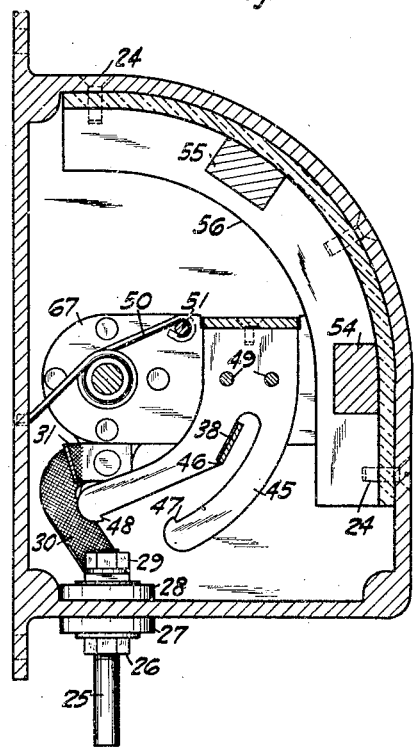
Fig. 3 is also a sectional view of the device, taken along the plane indicated by the line III—III in Fig. 2.
Figure 2:
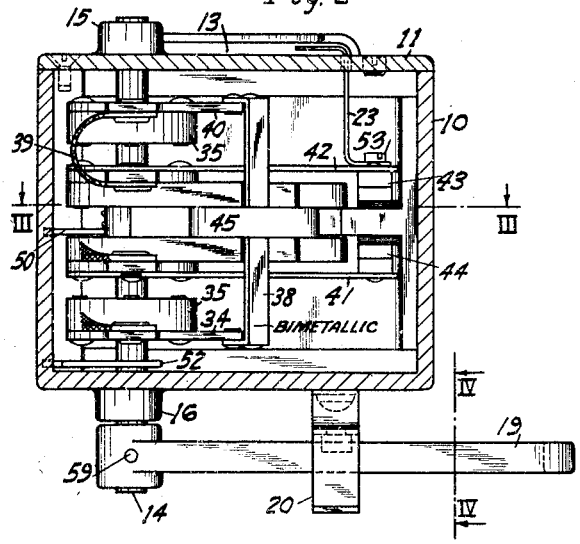
Fig. 2 is a sectional view of the device, taken along the plane indicated by the line II—II in Fig. 1.
Figure 4:
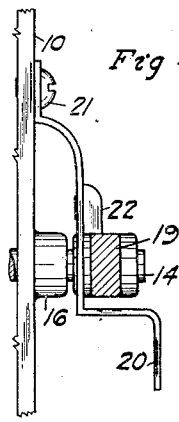
Fig. 4 is a fragmentary view showing the latch mechanism, taken along the plane indicated by the line IV—IV in Fig. 2.

In the space between the disks 35 are mounted, for rotative movement on and about the shaft 14, the supporting arms 66 and 67, also of fiber or other suitable insulating material, which extend away from the shaft 14 in parallel relation to one another. A metal arcuate detent yoke 45, including the detents 46, 47, and 48, is fitted in a space between the supporting members 66 and 67, and rigidly secured thereto by means of the rivets 49 (Fig. 3). A pair of parallel extending resilient metal contact arms 41 and 42 are rigidly secured, as by riveting, in insulated relation to the shaft 14, to the insulating supporting arms 67 and 66 respectively. The movable contacts 43 and 44 are fixed, in spaced face to face relationship, to the outer ends of the contact arms 42 and 41 respectively, in any suitable manner, as by the rivets 57.

The assembly just described is a contact structure, embodying the detent means 45 and the contact means 43 and 44, which structure is freely rotatable or swingable about the shaft 14, and may move independent of movement of the latter.

The first and second stationary conducting contacts 54 and 55 respectively are fixed, in spaced relation, to the arcuate insulator 56, and the latter is rigidly secured to the housing by means of the screws 24. The conducting contacts 54 and 55 extend laterally through the insulating member 56, and are of such dimensions and so positioned relative to the circumferential path of movement of the contact means including the contacts 43 and 44, that the latter normally engage the former upon rotation of the contact structure above described.

For the purpose of indicating the position of the movable contact with respect to the stationary contacts, a curved slotted indicator opening 13 is provided in the cover plate 11, through which an end portion of the indicating member 23 extends, the other end of the latter being rigidly secured to the movable contact member 43 by means of the screw 53. Indicia carried by the cover plate for registration with the indicating member 23 provides visual means of ascertaining the position of the movable contact means.

The spring 50, one end of which is attached to the contact structure by means of the pin 51, and the other to the housing, provides means for continuously biasing the contact structure including the contacts 43 and 44 for rotative movement about the shaft 14, and in a direction to move the contacts away from the stationary contact 54. The spring 52 is arranged to bias the shaft 14, along with the internal support for the bimetallic strip 38 and the operating lever 19, in the same direction.

The operating lever 19 cooperates with a resilient externally positioned latch, the latter including the downwardly and outwardly extending resilient metal strip 20, the upper end of which is fixed to the housing by means of the screw 21. Riveted to the strip 20, and arranged to engage the upper surface of the operating lever 19 when the bi-metallic strip 38 is in the position illustrated in Fig. 1, is the latch detent 22, and it is in this manner that rotation of the shaft 14 under the influence of the spring 52 is prevented under normal conditions.

For convenience in connecting the device to an electrical circuit, a pair of terminals 25 extend upwardly in spaced relation to each other through the bottom of the housing. The terminals 25 are insulated from the housing by means of the insulating washers 27 and 28; the nuts 26 and 29, engaging cooperating threads on the terminals 25, firmly fix the latter in place.

To complete the electrical circuit through the device, as illustrated by Fig. 10, the flexible conductors, or conducting braids, 30, 31, and 39 are provided. One of the pair of terminals 25 has the conductor 30 secured thereto by means of the terminal nut 29, and the conductor 31 is similarly secured to the other terminal. The upper end of the conductor 30 is riveted at 32 to an outwardly extending portion of the conducting supporting member 34. Similarly, the upper end of the conductor 31 is riveted at 33 to an outwardly extending portion of the conducting contact arm 41. The conducting braid 39 has its respective ends attached to the members 40 and 42 in a similar manner.

The electrical path through the device when in the initial closed circuit position illustrated by Fig. 1 is through one of the terminals 25, thence serially through the flexible conductor 30, the supporting arm 34, the thermo-responsive member 38, the supporting arm 40, the flexible conductor 39, the contact arm 42, the contacts 43, 54, and 44, the contact arm 41, the flexible conductor 31, and finally through the other of the pair of terminals 25.

Assuming that the device is connected to a circuit as illustrated by Fig. 10, and that it is latched in the initial closed circuit position shown by Figs. 1, 2, 3, 4, and 5, the operation of the device will now be explained.

So long as the current passing through the device does not exceed a predetermined value, the bi-metallic strip 38 continues to engage the first detent 46 of the detent yoke 45, thus maintaining the contacts 43, 54, and 44 in engagement to provide a closed circuit.

In the event of the passage of a current above the predetermined value, the portion of the bi-metallic strip 38 engaging the first detent 46 moves outwardly therefrom in response to the heating effect of the current to disengage the latter. At this time, the movable contact structure, under the influence of the spring 50, is rotated about the shaft 14 until the heated bi-metallic strip engages the second detent 47. Such a movement places the movable contacts 43 and 44 in the open circuit position between the stationary contacts 54 and 55, which position is indicated by the dashed lines at 64, Fig. 1.

The movable contact structure remains in the position last mentioned until the bi-metallic strip 38 is substantially restored to its initial shape, at which time it disengages the second detent 47. As a result of this occurrence, the movable contact structure is further rotated under the impulsion of the spring 50 and about the shaft 14 until the third detent 48 engages the now cooled bi-metallic strip 38. At this position, the circuit is again closed by the engagement of the movable contacts 43 and 44 with the second stationary contact 55.

The circuit remains closed through the stationary contact 55 until a second excessive current passes through the bi-metallic strip 38, at which time it again moves outwardly, disengaging the third latch detent 48. The movable contact structure is again rotated, under the influence of the spring 50, to disengage the stationary contact 55, and again open the circuit. The position of the movable contacts in this condition is shown by the broken lines at 65, Fig. 1.

In the specific embodiment illustrated, one reclosure of the circuit is provided, but it will be apparent that, by structural additions including added detents and stationary contacts, a larger number may be readily provided.

The procedure followed in restoring the device to the initial closed circuit position from any other position will now be explained.

The resilient latch member 20 is pressed toward the housing until the latch detent 22 disengages the operating lever 19. The shaft 14, together with the operating lever 19, and the bimetallic strip 38 together with its support, are now rotatively moved, under the influence of the spring 52, about the bearings 15 and 16 until the bi-metallic strip 38 engages the first detent 46. The operating lever 19 is then rotatively restored to its initial latched position, this movement actuating the movable contacts back to the initial closed circuit position.

It will also be apparent that the device will be actuated to the final open position under the influence of both the springs 50 and 52 when the operating lever is manually unlatched.

It will be observed that, in the process of re-setting the device from the final open position, the movable contacts 43 and 44 pass the second stationary contact 55. It is desirable to avoid closing the circuit through the latter contact when resetting the device, as otherwise, the conditions may be such as to heat the bi-metallic strip 38 so that it will not remain in engagement with the detent 46, but instead, will engage the detent 47. Obviously the device cannot be actuated to the initial closed position under this condition.

The means provided for avoiding such a condition are shown in Figs. 7 and 8. A guide member 58, having one end portion bent inwardly toward, and the other end portion bent outwardly from, the insulator 56, is positioned so that the resilient contact arm 42 passes on the inner side of the guide 58 when the contact arm 42 is moved in a direction to open the circuit, and on the outer side when the contact arm 42 is moved in a direction to restore the device to the initial closed circuit position. The engagement of the resilient contact arm 42 with the outer surface of the guide member 58 deflects the movable contact 43 away from the stationary contact 55 only during the re-setting operation. The position of the contacts in passing in a re-setting direction is illustrated by Fig. 8, and Fig. 7 illustrates the position of the contacts if moved under the impulsion of the spring 50.

As previously mentioned, the device herein illustrated may be readily provided with a greater number of circuit reclosures. It is also apparent that a simple switch having only one closed and one open position will result from a construction in which only one stationary contact and one detent is provided. Such a device is within the scope of this invention, inasmuch its construction is identical with the embodiment shown except for the omission of certain elements together with their functions. The tripping and re-setting procedures are the same. The fact that the construction is such that the support carrying the bi-metallic strip 38, and the contact structure including the movable contact means, are independently rotatively movable about the same axis makes feasible the construction of a switching device having a plurality of closed or open positions, or one embodying only one of each.

In any of these embodiments, it will be observed that it is impossible to hold the device in the closed position under overload conditions by means of the operating lever 19, for the reason that the movable contacts are independently movable with respect to the operating lever 19 upon the disengagement of the bi-metallic strip 38 from the detent means.

While the embodiment herein illustrated has been described in specific language for the purpose of facilitating an understanding of its construction and operation, it will be understood that various changes in the specific construction herein recited may be made without departing from the principles of the invention.

What I claim is new, and desire to secure by Letters Patent, is:

1. A switching device comprising a housing, a rotatable shaft extending therein, spaced relatively insulated first and second stationary contacts within said housing, a movable contact structure journalled for rotative movement on said shaft within said housing, said contact structure including contact means carried thereby and arranged to engage and disengage said stationary contacts, means rotatively biasing said movable contact structure, an externally positioned operating lever rigidly secured to said shaft, an external latch member preventing the rotation of said shaft, detent means carried by said contact structure, a support within said housing rigidly secured to said shaft, a bi-metallic strip mounted thereon, said bi-metallic strip cooperating with said detent means to maintain said contact means in engagement with the first stationary contact under normal temperature conditions of said bi-metallic strip, to permit, in response to an initial heating of said bi-metallic strip, the rotary movement of said contact means to a position between said first and second stationary contacts, to subsequently permit, in response to the cooling of said bi-metallic strip, a further rotary movement of said contact means to a position in which the latter engages said second stationary contact, and to finally permit, in response to a second heating of said bi-metallic strip, a yet further rotary movement of said contact means to a position beyond said second stationary contact.

2. A switching device comprising a housing, a rotatable shaft extending therein, spaced relatively insulated first and second stationary contacts within said housing, a movable contact structure journalled for rotative movement on said shaft within said housing, said contact structure including contact means carried thereby and arranged to engage and disengage said stationary contacts in the order named, latch means including an externally positioned operating lever rigidly secured to said shaft for preventing rotation thereof, a support within said housing rigidly secured to said shaft, a bi-metallic strip mounted on said support, detent means carried by said movable contact structure, and means rotatively biasing said movable contact structure, said bi-metallic strip cooperating with said detent means so as to permit the actuation of said contact means from engagement with said first stationary contact to disengagement therefrom in response to a first abnormal heating of said strip, thence to engagement with said second stationary contact in response to cooling of said bi-metallic strip, and finally to disengagement from said second stationary contact in response to a second abnormal heating of said bi-metallic strip.

3. In a switch, a housing, insulating means within said housing, a stationary contact supported thereby, bearing means in said housing, a shaft journalled for rotative movement therein, said shaft extending into said housing and externally thereof, contact means journalled for rotative movement on said shaft within said housing, the arrangement being such that said contact means engages and disengages said stationary contact in response to its rotative movement about said shaft, a support rigidly secured to said shaft within said housing, means including a bi-metallic strip rigidly secured to said support for actuating said contacts to engagement in response to a rotative movement of said shaft, means rotatively biasing said shaft in a direction to disengage the contacts, and externally positioned latch means for preventing the rotation of said shaft said latch means including an externally positioned operating lever rigidly secured to said shaft, and an externally positioned resilient member cooperating therewith.

4. A switch comprising a housing, a stationary and a relatively movable contact within said housing, means supporting the latter for rotative movement about an axis, means biasing the movable contact in a direction away from said stationary contact, a movable support within said housing, means mounting said support for rotative movement about the same axis, a bi-metallic strip carried by said support, said bi-metallic strip cooperating with said movable contact to restrain the movement thereof with respect to said support, and latch means external to said housing restraining the movement of said movable support.

CARROLL H. WALSH.